United States Patent [19]

Sambell

[11] Patent Number: 5,085,315
[45] Date of Patent: Feb. 4, 1992

[54] WIDE-RANGE BLADE PITCH CONTROL FOR A FOLDING ROTOR

[76] Inventor: Kenneth W. Sambell, 2625 E. Kenwood St., Mesa, Ariz. 85203

[21] Appl. No.: 347,754

[22] Filed: May 5, 1989

[51] Int. Cl.⁵ .......................................... B64C 27/22
[52] U.S. Cl. ...................................... 244/7 R; 244/6; 244/17.250; 416/142; 416/168 R; 416/104; 416/160
[58] Field of Search ............... 244/7 R, 7 A, 17.13, 244/7 C, 66, 6, 17.25; 416/142, 148, 168 R, 155, 98, 104, 105, 147, 160

[56] References Cited

U.S. PATENT DOCUMENTS

| | | | |
|---|---|---|---|
| 2,648,387 | 8/1953 | Doman | 416/168 |
| 2,684,213 | 7/1954 | Robert et al. | 416/142 |
| 3,404,852 | 10/1968 | Sambell et al. | 244/7 A |
| 3,515,500 | 6/1970 | Nachod | 416/142 |
| 3,528,630 | 9/1970 | Ferris et al. | 244/66 |
| 3,592,412 | 7/1971 | Glatfelter | 244/7 A |
| 3,729,276 | 4/1973 | Boyadjieff et al. | 416/160 |
| 4,750,862 | 6/1988 | Barnes et al. | 416/160 |

Primary Examiner—Joseph F. Peters, Jr.
Assistant Examiner—Anne E. Bidwell
Attorney, Agent, or Firm—Gregory J. Nelson

[57] ABSTRACT

A blade pitch control system for a rotary wing aircraft which incorporates a mast and rotor which is pivotally adapted for movement of the mast between a generally horizontal stored position and a vertical position for operation in a helicopter mode. The pitch control system incorporates a motion amplification mechanism such as a star gear arrangement connected to the pitch horn to amplify control motions which are transmitted to the pitch horns through a push-pull control tube generally parallel to the folding axis of the rotor blade. In another embodiment, the push-pull tube inputs parallel to the mast axis. A locking mechanism retains the blades so pitch changes cannot be made during a predetermined portion of the blade coning cycle.

11 Claims, 6 Drawing Sheets

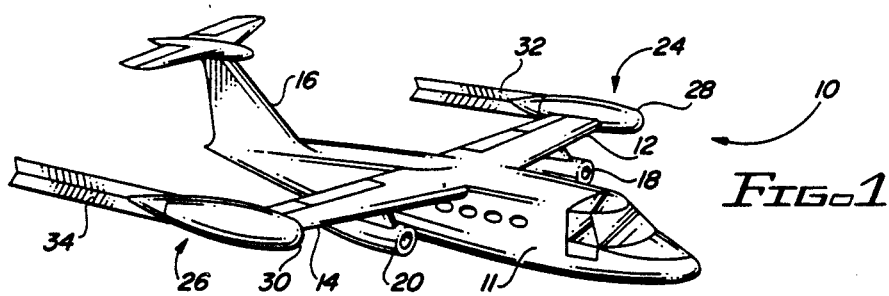
FIG. 1
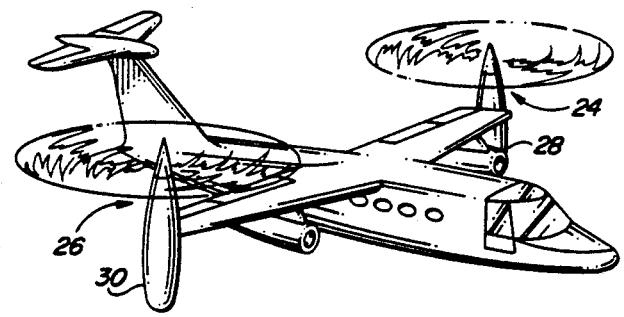
FIG. 2
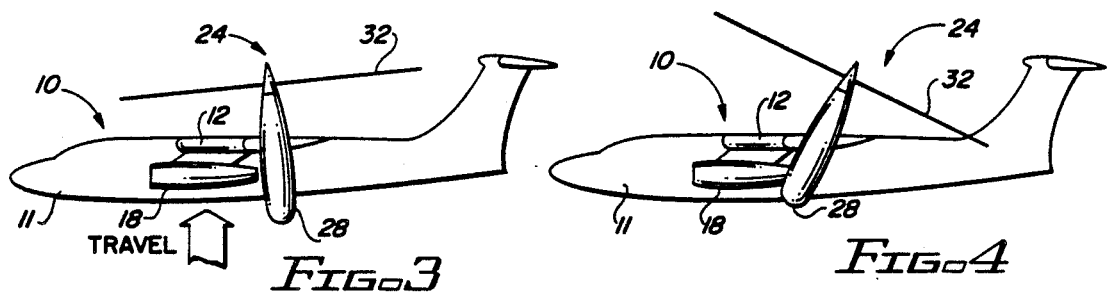
FIG. 3   FIG. 4
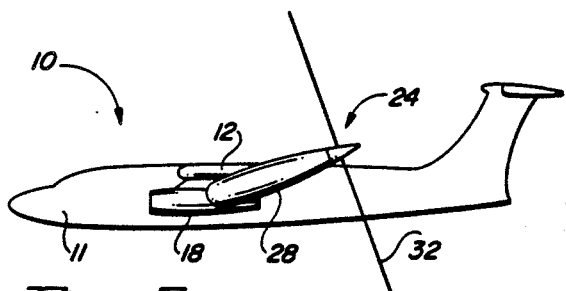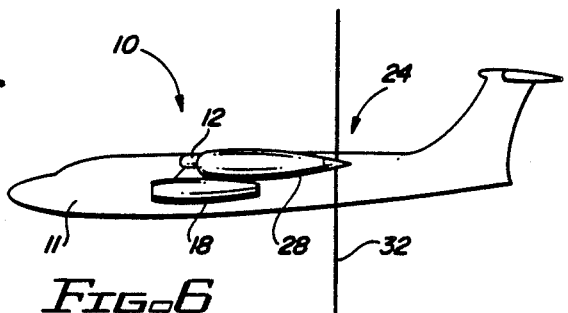
FIG. 5   FIG. 6
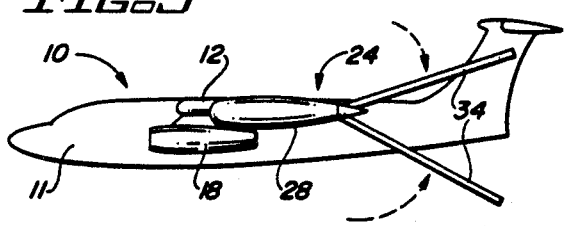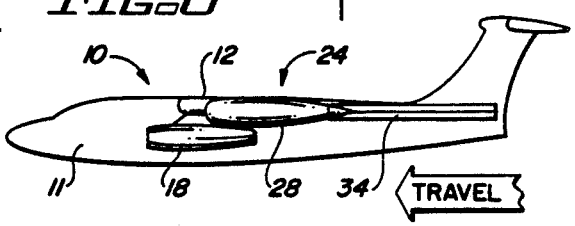
FIG. 7   FIG. 8

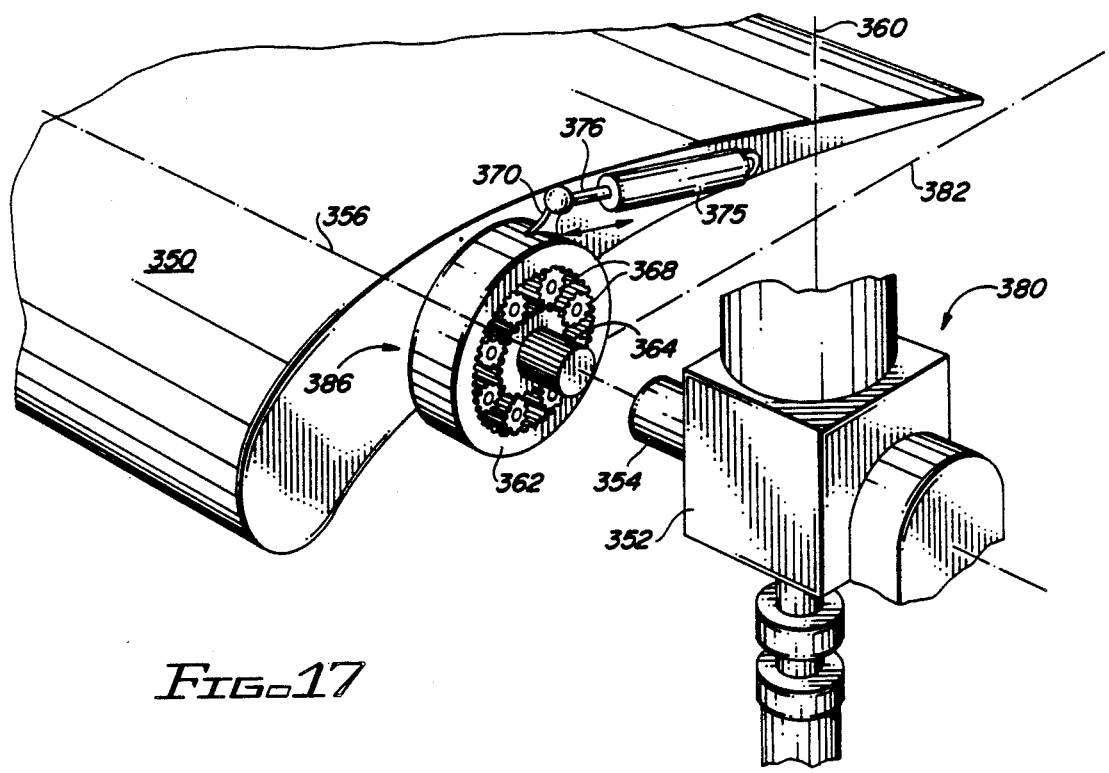
FIG. 17
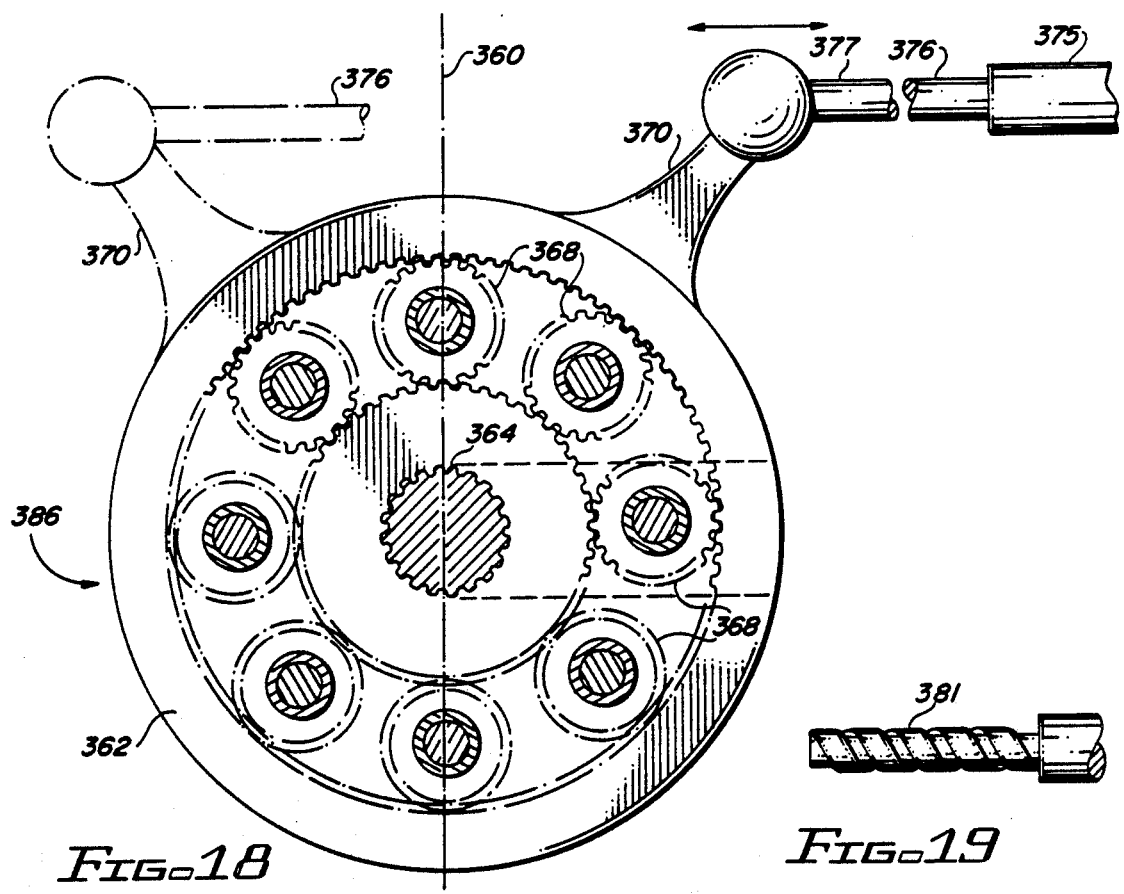
FIG. 18
FIG. 19

WIDE-RANGE BLADE PITCH CONTROL FOR A FOLDING ROTOR

The present invention relates to aircraft and particularly relates to a blade pitch control system for a folding rotor of the type utilized by aircraft capable of both fixed and rotary wing flight.

The helicopter is a basic and integral part of military mobility systems and of general and commercial aviation transportation systems. This is due in large to the helicopter's ability to hover and its low speed maneuverability. The hover and low-speed capability is achieved through use of one or more rotors which provide vertical lift.

However, the helicopter has certain inherent disadvantages which have restricted the use of the helicopter. In cruise flight, the helicopter achieves lift and forward thrust or propulsion from the main rotor. This is accomplished by altering the angle of each blade as it rotates around the disc (cyclic pitch) such that the resulting force vector is tilted slightly forward. During forward flight mode, the lift moment from left to right halves of the rotor disc are equalized. This is done by blade flapping and by longitudinal-cyclic pitch control. This complex edgeward flight of the rotor is inefficient for producing forward thrust and produces high oscillatory loads on the blades and related structure and controls. Thus, the high vibration levels impose limitations as to structural life, high maintenance and passenger and crew discomfort. The net result is that helicopters are generally limited to moderate speeds 130 to 170 knots) and moderate range.

One particular aircraft concept has shown promise in minimizing or eliminating the problems attendant to conventional helicopters. This concept is a tilt-rotor or convertiplane aircraft. This design provides one or more rotors which produce the hover lift and which can be tilted for high speed flight. In early "tilt" rotor versions, the rotors were forwardly tilted for flight and served as conventional propellers while lift was produced by the conventional wing. The tilt rotor concept was originally developed ed by Bell Helicopter Company for the Army and Air Force in the early 1950's. Later configurations were designated "Trailing Rotor Convertiplane" and enjoyed the advantage of vertical take-off/landing, and in cruise mode utilized a folded condition with the blades trailing.

In the cruising mode such aircraft operate with the blade assembly in the trailing mode and when the advantage of vertical take-off and landing and hovering capability is required, such maneuvers are performed with the rotary wing assembly in the helicopter mode of operation. One of the principal problems encountered in such aircraft is the transition from rotary wing flight to fixed wing flight and vice versa. Such conversion must occur in a manner to avoid imposition of undue and unnecessary stresses on the rotary wing assembly and aircraft.

U.S. Pat. No. 3,404,852 of which I am a co-inventor, discloses a programmed system controlling blade-pitch and position of the blade assembly during conversion which avoids undue stresses on the wing assembly. As pointed out in U.S. Pat. No. 3,404,852, various criteria must be met in the design of such aircraft as follows:

(1) When the aircraft is operating in the fixed wing mode of operation, the rotary wing assembly must be folded and stored in a position which imposes minimum drag during forward flight.

(2) The change or conversion between the two modes of operation must be accomplished to avoid undue stresses on the rotary wing assembly and on the aircraft.

(3) Uncontrolled movement or flapping of the rotor blade must be minimized during transition to avoid 1 undue stress on the rotary wing assembly.

(4) Steady flight should be maintainable at any configuration encountered during the transition process between fixed wing and rotary wing flight.

(5) Rotary wing lift effects incidental to transition from fixed wing to rotary should be of smoothly increasing magnitude and should be positive at all times. During transition from rotary wing to fixed wing flight, the lift effect should be smoothly decreasing and substantially positive at all times.

In addition to the foregoing requirements, a conversion and blade pitch control system should provide the following:

(1) Blade pitch changes should be permitted during blade folding and unfolding and the pilot should be provided a wide range of collective-pitch changes (100° to 120°).
(2) Pitch cone coupling should also be permitted during blade folding and unfolding.
(3) The pitch horn travel be less than 90° even though blade pitch ranges of 100° to 120° can be achieved.
(4) The blade control assembly should be compact and allow synchronized folding and pitch changes.

Accordingly, it is a primary objective of the present invention to provide a simple and effective wide range blade pitch control for a folding rotor assembly for a convertiplane aircraft.

Other objects and advantages of the present invention will become more apparent from the following description taken in conjunction with the drawing figures in which:

FIG. 1 is a perspective view of a convertiplane in cruise mode flight;

FIG. 2 is a perspective view of a convertiplane in a helicopter flight mode;

FIGS. 3 to 8 are diagrammatic views showing a convertiplane aircraft during conversion from the helicopter mode of flight (FIG. 3) to cruise flight (FIG. 8).

FIGS. 17 and 18 show the invention in connection with the mast conversion system.

FIG. 19 shows an alternate mechanism used to control a push-pull tube.

Figure 9:
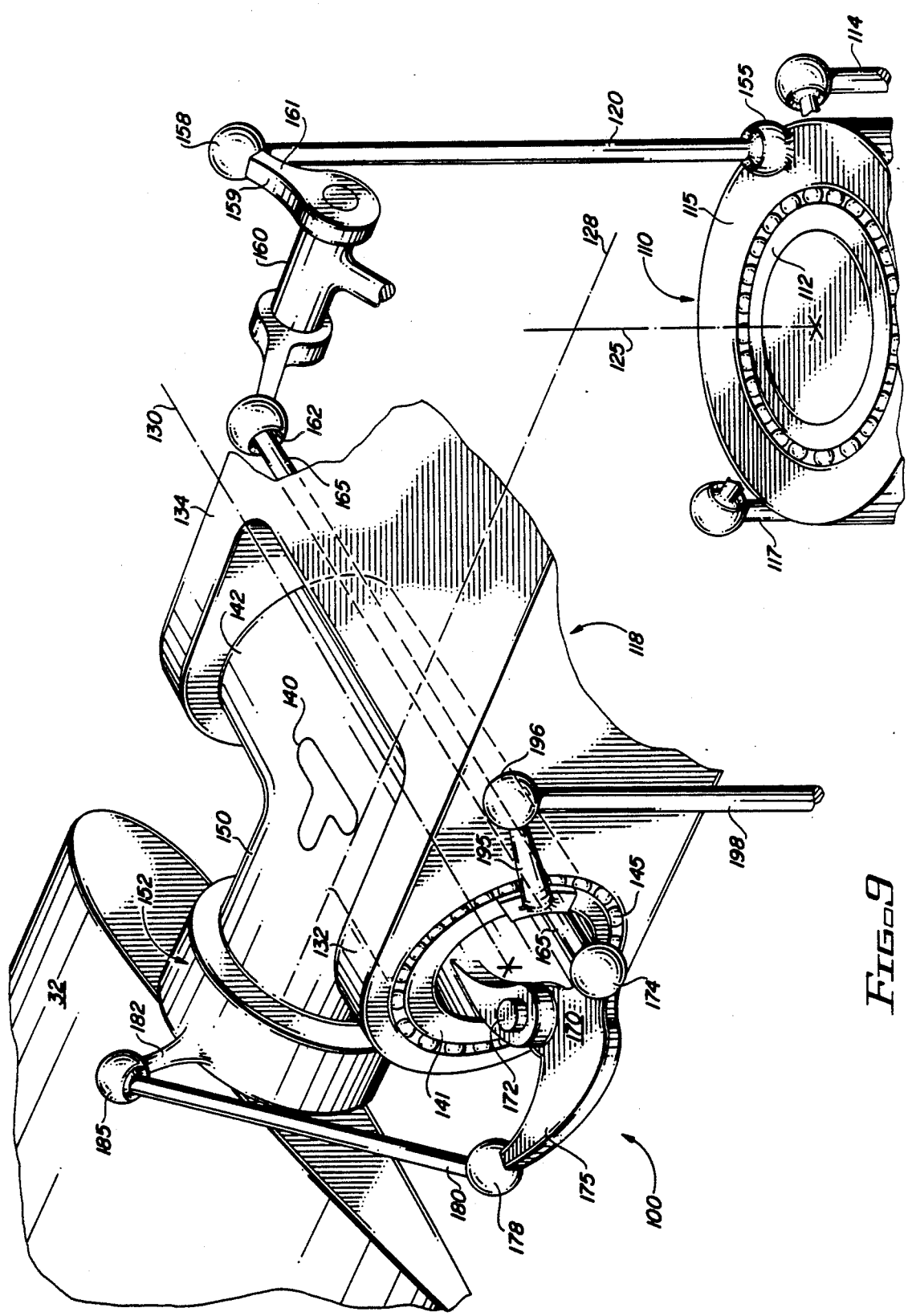
FIG. 9 is a perspective view of a portion of the mast and blade illustrating one embodiment of the control system.

Referring now to FIGS. 1 and 2, numeral 10 indicates a trailing rotor vertical-lift aircraft which aircraft includes fuselage or body 11 having a pair of oppositely extending fixed wings 12 and 14 and an upstanding T-tail assembly generally designated by the numeral 16. In the specific embodiment shown, a pair of jet engines 18 and 20 are positioned on pylons below the wings to power the aircraft. Pivotally attached to the tips of the wings 12 and 14 for movement about axes extending transversely of the aircraft are a pair of rotary wing assemblies 24 and 26. Pylons 28 and 30 house the mast and drive components that rotate blades 32 and 34. As is well known in the convertiplane art, power from engines 18 and 20 may be utilized to propel the aircraft in fixed wing mode of operation and may be selectively connected to power the helicopter blades in the mode of operation. It is also possible to employ separate engines for fixed wing and rotary wing operation. The particular manner in which the aircraft is powered may be accomplished in any well known manner and forms no particular part of the present invention.

At the outset, it is believed helpful to an understanding of the invention to set forth definitions of certain terminology of the helicopter arts particularly applicable to trailing rotor vertical-lift aircraft and which terminology is used herein.

FLAPPING MOTION refers to a motion of the blades about a chordwise or transverse axis at or adjacent the root end of the blades.

PITCH MOTION of the blade refers to pivotal motion of the blades about an axis extending longitudinally of the blade to alter the angle of attack of the individual blades during rotary wing flight. A blade pitch change is termed "positive" when it produces a positive change in lift on the aircraft as the blades are rotated with the mast essentially vertical. A pitch change is designated as "negative" when the blades produce a negative change of lift on the aircraft.

ZERO BLADE PITCH is defined as the blade chord in the plane of rotor rotation.

COLLECTIVE PITCH refers to a pitch change imparted to several blades of each rotary blade assembly which pitch is simultaneously imparted to all of the blades.

CYCLIC PITCH is longitudinal pitch change applied during pylon conversion to maintain the longitudinal flapping angle small and to obtain optimum combination of longitudinal force parameters. Cyclic pitch varies from approximately zero degrees to a maximum of six degrees through a mast angle change of 90°.

Referring again to FIGS. 1 and 2, in the fixed wing flight mode as shown in FIG. 1, pylons 28 and 30 are disposed in substantially horizontal positions and the blades 32 and 34 extend horizontally rearwardly in trailing positions. In FIG. 1, blades 32 and 34 are shown in position of minus 90° pitch. In the trailing position, the rotary wing assemblies 28 and 30 offer minimum drag and the aircraft is in the operational mode for most efficient cruising or forward flight under power of engines 18 and 20. In this position, as will be more fully explained hereafter, it is also noted that the portion of the root or inner end of the blade assemblies are engaged in receiving grooves in When it is desired to make the transition between fixed wing flight (FIG. 1) and rotary wing flight (FIG. 2), blades 32 and 34 are initially unfolded about their flapping axes through an approximate angle of 90° while the pylons 28 and 30 remain horizontal and during which time the pitch of the blades 32 and 34 is increased from about minus 90° to about minus 80°. As a result, the rotary wing assemblies are caused to auto-rotate at a rotational speed which is sufficiently high to minimize flapping due to gravity. A further pitch input increases the pitch to about negative 40°. As a result, the rotary wing assemblies are auto-rotatively accelerated to a speed which is approximately one-half the speed at which the blades will be powered to effect forward flight, hovering at VTOL capabilities. With the blades in this position, pylons 28 and 30 may be rotated about their axes to be positioned substantially vertical. During this time, the pitch of the blades is coordinated to bring the rotational speed of the blades up to or substantially up to operating speeds. Thus, the rotational speed of the blades is approximately doubled during the time the pylon is rotated from the horizontal to the vertical positions. During the transition, no power is required to be applied to the rotary wing assemblies.

The transition between fixed wing and rotary wing flight is reversed to change from rotary wing flight to fixed wing flight. Power to the rotary wing mast is terminated and the flight controls are operated to cause the rotor blades to auto-rotate at a substantially unchanged. Pylon conversion may be continued and the mast moved rearwardly with the pitch of the blades gradually increased negatively so that the auto-rotational speed of the blades will decrease as the pylon is moved aft. Thereafter, the blades are moved about their flapping axes until they assume the position shown in FIG. 1, having a negative pitch of 190°.

FIGS. 3 to 7 illustrate the transitional operation between rotary wing flight and fixed wing flight. These figures are diagrammatic side views showing one rotary wing assembly 24, it being understood that the description also applies to other rotary wing assembly 26. FIG. 3 illustrates the aircraft 10 in rotary wing flight with the mast 28 in a generally vertical or slightly forward of vertical position with power being applied to the rotor. In the position shown in FIG. 4, power to the blade is terminated and the blades are auto-rotating substantially at full speed. In this mode of operation, the rotary wing will maintain the aircraft at a fixed altitude. As mast 28 is rotated rearwardly to the position shown in FIG. 5, the pitch of the blades is gradually increased negatively so that the auto-rotational speed of the blades will decrease as the pylon is moved aft, so that when the pylon assumes a substantially horizontal position as shown in FIG. 6, the auto-rotational speed of the blades will be substantially one-half of the operating speed of the blades when in the position shown in FIG. 3. A pitch change to approximately −80° is then effected. The blade tip speed will be gradually reduced to a folding tip speed which is about 5% to 15% of the operating tip speed. The blades are then moved or pivoted about their flapping axis until they assume the trailing position shown in FIG. 7. During this time, the negative pitch of the blade is decreased to a −90° pitch at which position the auto-rotation of the blade stops. At this point, as will be explained in detail hereafter, with the present invention no further blade pitch change is possible beyond about 45° as the blade trailing edges will enter a locking arrangement in the fairing hub to restrain further pitch change. During unfolding, the reverse sequence occurs and the blade pitch control is regained only when the blade is at about one-half the fully opened position. FIG. 8 illustrates the cruise mode of operation with the blades stationary and in a trailing position and with the aircraft powered by engines 18 and 20.

Figure 16:
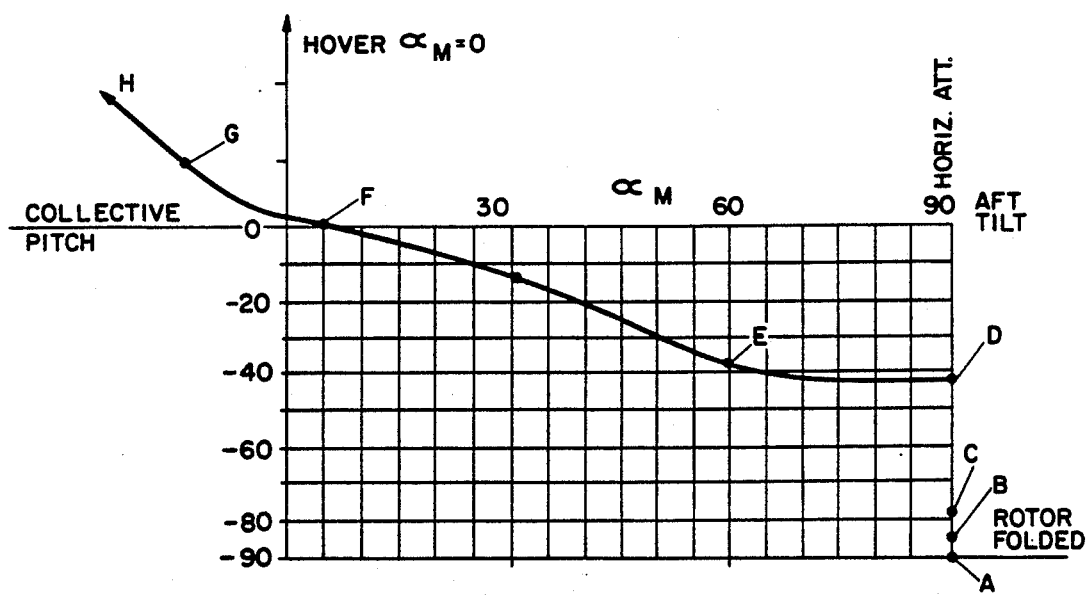
FIG. 16 is a graph showing the collective pitch the rotor at various pylon angles during conversion.

The coordinated pylon blade movements described above are graphically illustrated in FIG. 16. At point A on FIG. 16, the blades and associated pylon are in the position shown in FIG. 8 with the rotor blades fully folded. Point B on FIG. 16 illustrates the rotor in a partially unfolded position at the point the pitch control remains ineffective to change blade pitch which is approximately at the 45° of blade coning, as illustrated in FIG. 7. Further unfolding will move the blades to the position shown in FIG. 6 which corresponds to point C on FIG. 16 at which time the blade pitch is about −80° and the rotational speed of the rotors is about 5% to 15% of the operational speed. Thereafter blade pitch is increased to about −40° and the rotational speed of the blades is gradually increased to about one-half of the operational speed which condition is shown in FIG. 6 and represented as point D on FIG. 16.

Next, the mast is pivoted towards its upright position with the collective pitch of the blades being increased until at point E a collective pitch of about −35° is reached and the mast assumes an angular position of about 60°, as shown in FIG. 5. Rotation of the mast continues with the collective pitch of the blade increased until at point G it corresponds to the position shown in FIG. 4 with the blades having zero collective pitch with the auto-rotational speed of the blades being substantially equivalent to operational speed. Power is then applied to the rotor assembly and the mast is tilted forward and at point H the aircraft is operational in the helicopter mode of operation.

It will be understood that FIG. 16 represents collective pitch imparted to the several blades of each rotary blade assembly 24 and 26. In other words, FIG. 16 refers to the pitch characteristics which are simultaneously imparted to all blades with three being typical. In addition to collective pitch control during transitional flight, it has been found that is desirable to apply cyclic pitch during pylon conversion in order to keep flapping angles small and to obtain the optimum combination of force parameters. Any excessive degree of blade flapping will impose undue stresses on the wing assembly. In order to achieve this, the inherent tendency of a rotating blade to resist flapping is utilized. When the mast is horizontal, little tendency to flap is normally encountered. However, as the mast is moved from the horizontal to the vertical position, the tendency for the blades to flap is increased. Thus, the blades are rotated at such a speed when the mast is not horizontal, so that proportionally greater speeds may easily be obtained at intermediate positions of the mast to compensate for flapping tendencies throughout the transitional period. It is to be noted that rotational speed of the blades may be attained by auto-rotation or by combination of auto-rotation and applied power.

Figure 10:
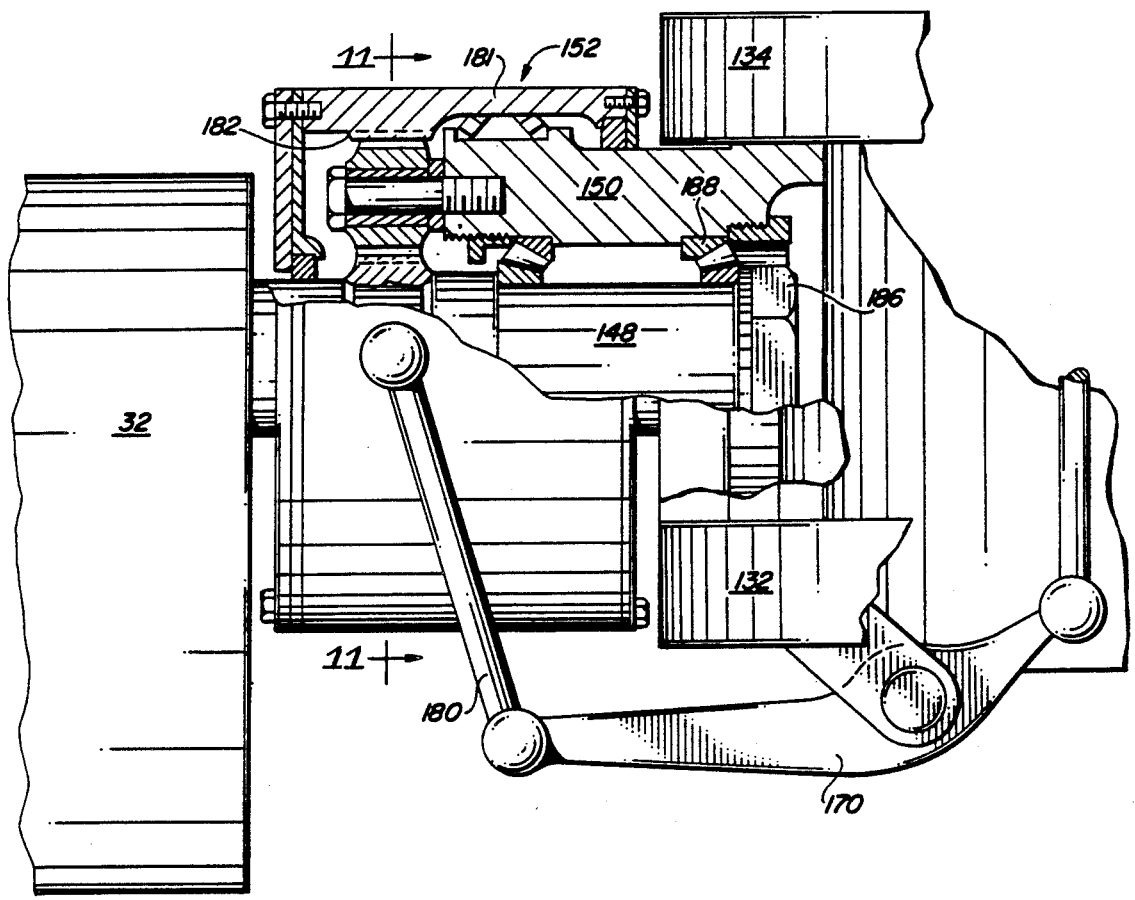
FIG. 10 is a top view of a portion of the mast and blade partly broken away.
Figure 11:
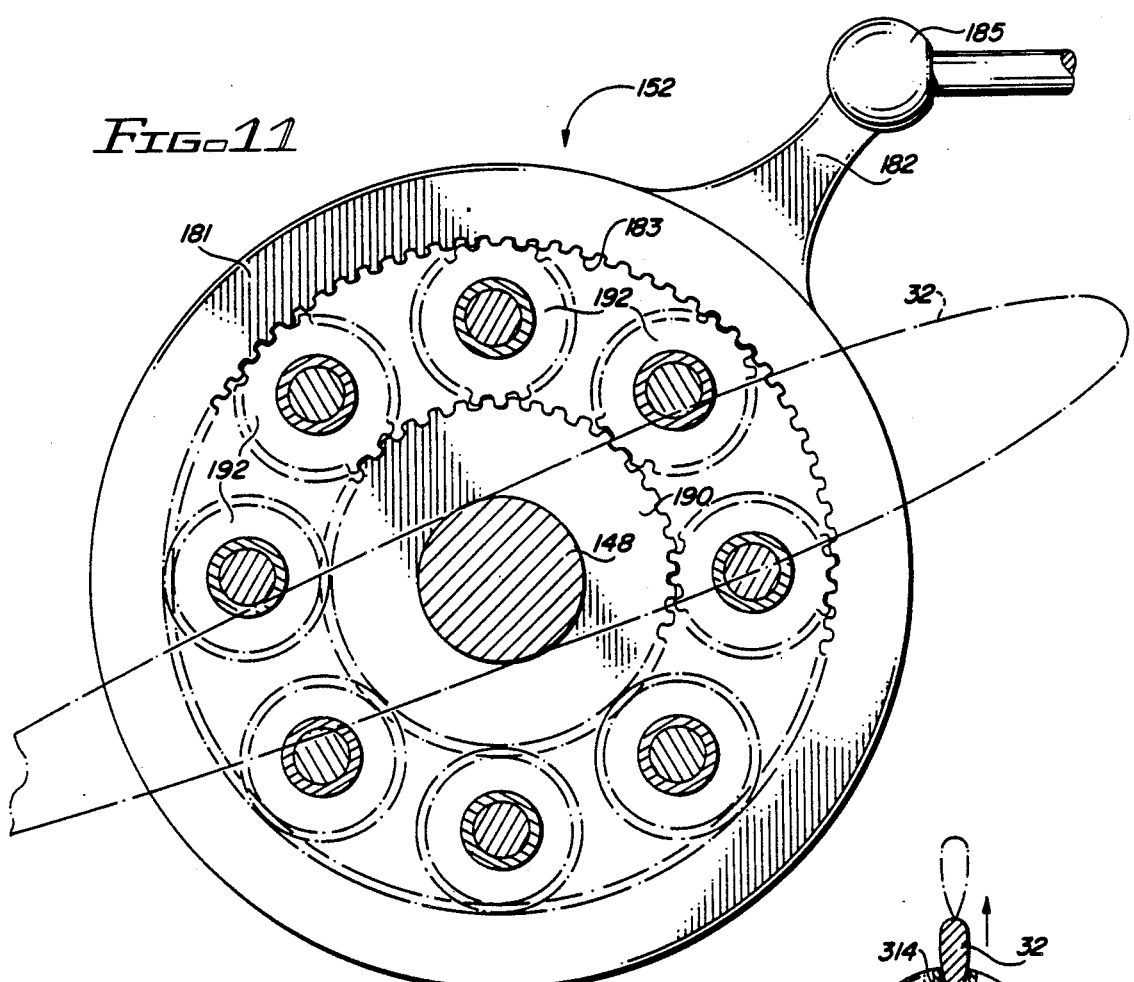
FIG. 11 is a sectional view along lines II—II of FIG. 10.

The present invention provides an improved blade pitch linkage control system, a preferred embodiment 100 of which is shown in FIGS. 9, 10, and 11. These figures illustrate the blade pitch linkage and control system as applied to one blade of rotor, it being appreciated that the system will operate to simultaneously apply control movements to all blades of the rotor as well as to multiple rotors. The longitudinal, lateral and directional control movements are generally achieved by pilot-operated control sticks and a rudder mechanism through various mechanical linkages or through electronic or electromechanical devices.

The movements of the collective-stick and cyclic-stick are normally imparted to a swash plate assembly to achieve blade-pitch control. Generally the lower end of the pylon terminates at a gear box which is rotatively mounted on the wing by means of a pylon axle. Drive is imparted to the mast by a transmission assembly. The particular mechanism for imparting movement to the collective and cyclic pitch controls and for coupling the transmission to the mast and for effecting speed changes are well known to those in the helicopter arts. Accordingly, in the interest of clarity, derailed discussion of these components is not set forth as these are conventional and comprise no part of the present invention. For reference, further detailed discussion may be found in U.S. Pat. No. 3,404,852 regarding these components.

In this embodiment 100, one blade of a rotary assembly is designated by the numeral 32. The cyclic swash plate is designated by the numeral 110 and has an inner non-rotating ring 112 connected to control rods 114 and 117 which are connected to the pilot-operated control system, not shown. The outer swash plate ring 115 rotates relative to the inner ring 112 and is connected at circumferentially, equidistantly spaced locations to control rods 120. Control rods 120 are generally vertically oriented and are parallel with respect to mast axis 125. In the specific embodiment shown, there are three blades in the rotor system only one of which is shown, it being understood that the controls associated with the remaining blades are substantially identical to that shown with respect to blade 32.

The blade feathering axis or the pitch change axis extends longitudinally of the blade and is designated by the numeral 128. The blade folding axis is designated by the numeral 130 and is generally perpendicular to the blade feathering axis. Hub 118 mounts the blades to the mast and supports the blades for rotation also supports the various control members is provided with a pair of spaced-apart clevis arms 132 and 134 for each rotor blade. Tee 140 has oppositely-extending projections 141 and 142 which are journaled for rotation in hub clevis arms 132 and 134 about the blade fold axis 130. Appropriate ball bearings or journal bearings 145 are provided to facilitate rotation of the tee relative to the hub. The inner or root end of blade 32 is rotatable at shaft 148 relative to star gear assembly 152 carried on projection 150 of tee 140. Projection 150 and star gear assembly 152 are concentrically aligned with the blade feathering or pitch change axis 128 as will be discussed in detail hereafter with reference to FIG. 11. Blade pitch changes are transmitted from the conventional non-rotating controls to the inner ring 112 of the swash plate assembly. Changes are then transmitted via rod 120 which has its lower end connected at ball joint 155 to outer swash plate ring 115. The opposite, upper end of link 120 is connected at ball joint 158 to arm 161 of bell crank 159. Bell crank 159 is journaled for rotation at bearing member 160 which is attached to hub 118. The opposite end 24 of bell crank 159 is connected to link 165 at ball joint 162 Link 165 is substantially parallel to the blade fold axis 130. The opposite end of link 165 connects to bell crank 170 at ball joint 174. Bell crank 170 is pivotally attached to tee 140 at pivot shaft 172. Arm 175 of bell crank 170 supports ball joint 178 which is connected to push-pull tube 180. The opposite end of tube 180 is connected at ball joint 185 to the blade pitch horn 182. It will be observed that ball joint 162 does not fold with the blade when blade folding occurs. On the other hand, bell crank 170 and pivot shaft 172 are attached to tee 140 and fold with the blade. Thus, joint 172 is in the folding system and link 165 being parallel to the blade fold axis is not in the folding system.

A star gear system is employed for achieving blade pitch changes and serves to amplify the motion of the pitch horn 182 typically by a factor of two to three. Accordingly, the system shown in FIGS. 9, 10 and 11 allow changes to be made by the pilot during blade folding and unfolding and provides a wide pitch range with a relatively minimal range of motion of the pitch horn. This arrangement also allows pitch cone coupling to occur during folding and unfolding of the blade.

The star gear system 152 includes generally circular cylindrical housing member 181 having a circumferentially-extending internal ring gear 183 on its inner surface. Blade stub shaft 148 extends longitudinally within the star gear assembly coaxial with the blade feathering axis terminating at blade retainer nut 186. Blade stub shaft 148 is rotatively mounted in bearings 188 within projection 150 of tee 140. Sun gear 190 is provided about the external surface of the blade shaft 148 and a plurality of star gears 192 are interposed between gear ring 183 and gear 190 forming a planetary arrangement. The number of star gears and the configuration of the gear teeth may vary with the particular application but it is preferred that the overall gear arrangement provide an amplification of the motion of the pitch blade horn 182 of approximately two to three. Thus, it will be seen that control motions input at blade pitch link 120 are transmitted through rocker arm 161, link 165, crank 170, push-pull tube 180 to the blade pitch horn 182. Movement in the blade pitch horn will be amplified and transmitted through the gear system to the blade shaft 148 and blade 32. The star gear arrangement position of link 165 which is parallel to the blade fold axis allows blade pitch changes to be made by the pilot during blade folding and unfolding to provide a wide range of control movement. Because of this arrangement, pitch-cone coupling may also take place during the folding and unfolding of the rotor blades.

Blade fold about axis 130 is accomplished through actuator arm 198 operatively connected to blade fold horn 195 at ball joint 196. The inner end of the blade fold horn 195 is attached to tee 140. The angular range of motions of the blade pitch horn housing remain moderate while allowing a wide pitch change needed for unfolding the rotor blade. The actuator arm 198 may be connected to an electric or hydraulic actuator, not shown.

Since ball joint 162 does not fold with the blade, it does not respond to rotor coning and blade pitch changes can be induced by rotor coning. This is known as pitch cone coupling. The greater the distance joint 162 is from the folding axis 130 and the shorter the length of link 165, the greater the pitch cone coupling ratio. Desirable values of this ratio are in the range of one-tenth to one-third so that blade folding and unfolding of 90° induces a related pitch change of 9° to 30°.

Figure 12:
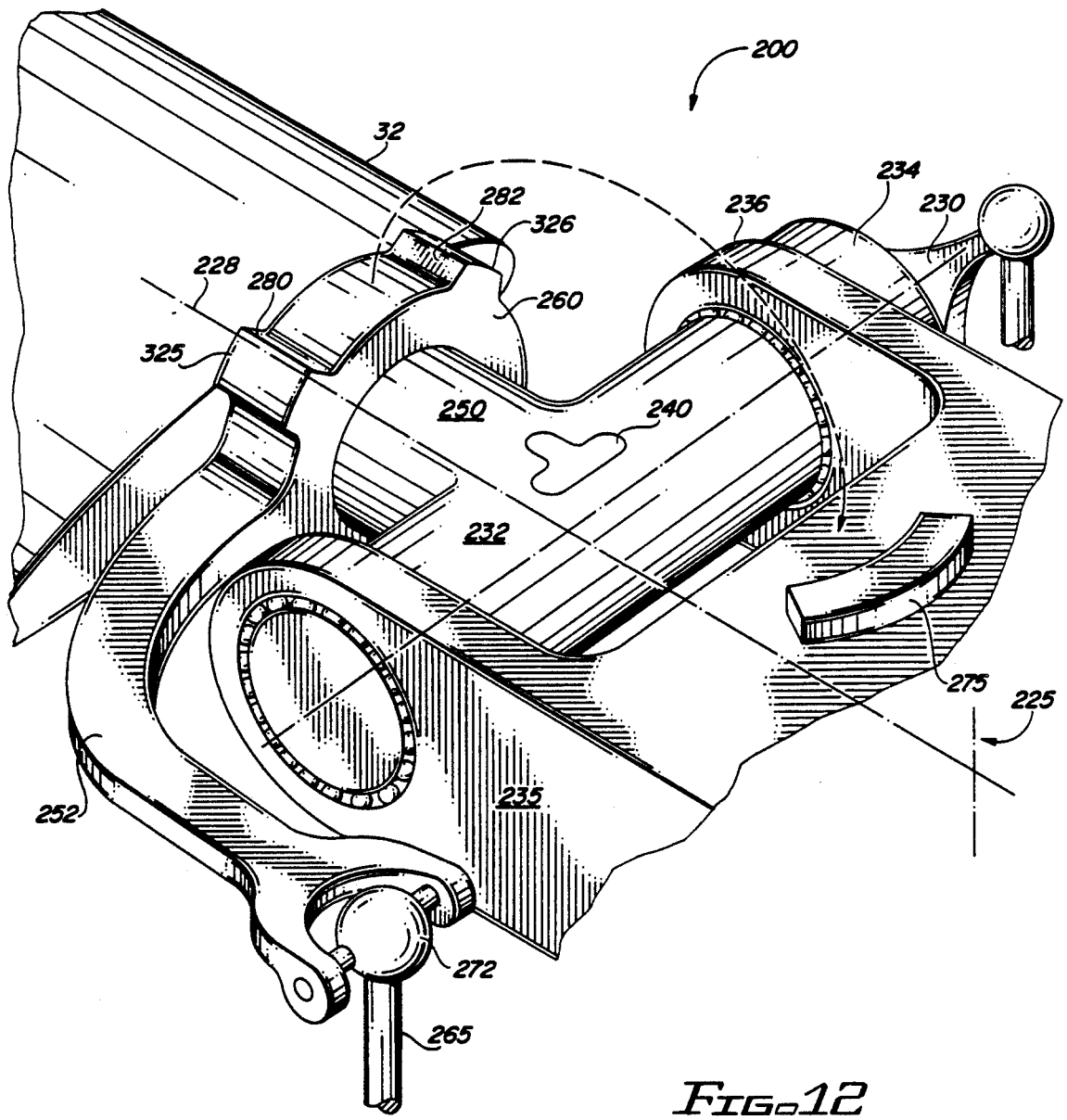
FIG. 12 is a perspective view of a portion of a mast and blade illustrating an alternate embodiment of the control system.

A simplified arrangement of wide-range pitch control for folding rotors is shown in FIG. 12 and is generally designated by the numeral 200. The construction includes a blade 32 with feathering axis 228 extending longitudinally along the blade. The inner end of blade 32 is rotatively mounted relative to extension 250 of tee 240. Tee 240 rotatively supports pitch horn 252. Oppositely extending projections or trunion members 232 and 234 are concentrically arranged with respect to fold axis 230 and are rotative within spaced-apart hub arms 235 and 236. Pitch horn 252 extends from pitch horn housing 260 terminating at universal joint 272. Universal joint 272 receives the upper end of push-pull tube 265, the opposite end of which is connected to the swash plate, not shown. The longitudinal off-set between the axis of universal joint 272 and the fold axis 230 establishes the pitch cone coupling ratio. The mast axis is designated by the numeral 225. Other control elements are conventional in the art and are not shown for purposes of clarity.

Pitch horn housing 252 is generally as has been described with reference to FIGS. 9, 10 and 11 having an internal ring gear through which a star-gear arrangement imparts and amplifies the angular range of motion imparted to the pitch horn. In this embodiment, the push-pull tube 265 is directly actuated from the swash plate by input motion substantially parallel to the mast axis 225.

Figure 13:
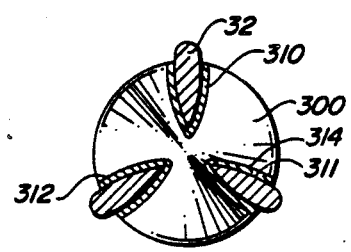
FIGS. 13 to 15 are end views of the pylon fairing showing various blade positions during conversion between cruise and helicopter flight.
Figure 14:
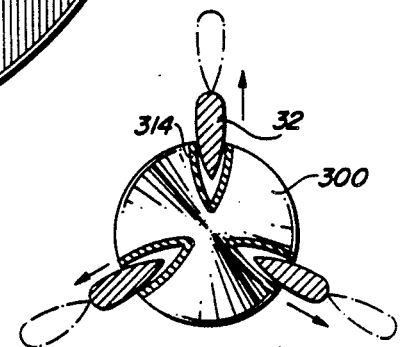
Figure 15:
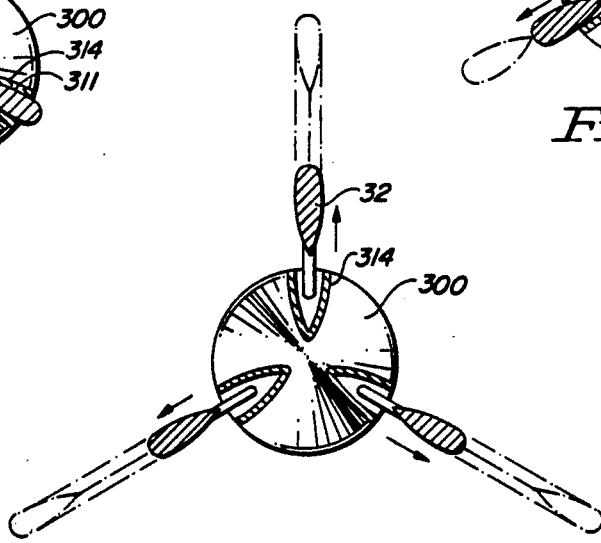

A further provision of the pitch control of embodiment 200 locks the pitch control mechanism so blade pitch control changes cannot be made after blade coning or folding has exceeded about 45° from the fully opened position. As best seen in FIGS. 13 to 15, fairing 300 is provided with slots 310, 311 and 312 longitudinally extending in the outer surface of the conical fairing. The slots are spaced apart an equal distance and have a cross-sectional configuration generally corresponding to the cross-sectional configuration of the trailing portion of the blades 32. The cross-sectional configuration of helicopter blades may vary from a tear-drop shape to a generally V-shaped symmetrical configuration, as shown. The interior surfaces of the longitudinally extending grooves or slots 310, 311 and 312 are preferably provided with a lining of a rubber or other resilient material 314. When the trailing edges or root end of each of the blades enter the respective grooves in the hub, the blades are restrained from movement about the longitudinal feathering axis.

Conversely during blade unfolding, blade pitch changes cannot be accomplished during the first 45° of unfolding until such time as the trailing edge of the inner end of the blades have cleared the grooves in the fairing as seen in FIG. 15. The fully engaged blade position is shown in FIG. 13.

As either an alternate or auxiliary locking arrangement to restrict blade pitch control changes, the pitch horn 260 may be provided with a pair of spaced apart stops 325 and 326, as seen in FIG. 12. Stops 325, 326 are shown as being generally trapezoidal in cross-section and project from the upper surface of the pitch horn having locking surfaces 280 and 282. A cooperating locking bar 275 is positioned on the upper surface of the hub being generally symmetrical with respect to the feathering axis 228. As the blade folds, the opposed tapered surfaces 280, 282 will engage the opposite ends of the locking bar 275 to secure the pitch horn against motion during predetermined portion of the blade folding and unfolding operation. The converse is true and pitch changes are restrained during initial unfolding due to the engagement of stops 325 and 326 with the locking bar 275 on the hub.

This simplified locking system also allows pitch cone coupling to take place during approximately the first 30° to 45° of blade folding. No further pitch changes may be initiated while the blades are locked against movement either by utilizing grooves in the fairing, the cooperating lock bar and stop or combination of the two locking arrangements.

The pitch horn amplification mechanism of the present invention is also applicable to the mast conversion system. Referring to FIGS. 17 and 18, one wing of the aircraft is generally indicated by the numeral 350 having a pylon assembly 380. The lower end of pylon assembly 380 terminates at a housing 352 which is rotatably mounted relative to the conversion axis 356. Drive is imparted to the mast assembly by means of an input shaft, not shown, appropriately connected to the aircraft engine. The mast or pylon assembly 380 is shown in the general vertical position in FIG. 17 and is pivotal from this position to a forward tilt position approximately 30° forward of the position shown in FIG. 17. The vertical mast position is indicated by the numeral 360. In the trailing position, the mast assumes a position in which the longitudinal centerline of the mast aligns with axis 382.

Mast conversion is achieved by means of star gear system 386 which has a sun gear 364 concentrically positioned with respect to axis 356. Sun gear 364 is operatively connected to the pylon axle 354. A plurality of star gears 368 are interposed between sun gear 364 and housing 362 which is provided with internal gear teeth. The star gear axles are attached to the wing 350. Pitch horn 370 is coupled to housing 362 and is shown as being operatively connected to linear actuator 375 having extendible rod 376 connected to the pitch horn by push-pull tube 377. Alternatively, the tube 377 may be controlled by screw jack 381 as shown in FIG. 19, or a similar mechanism. In the position of the pitch horn shown, the mast would assume a generally vertical position. Upon extension of rod 376 of linear actuator 375, the pitch horn is rotated leftward as seen in FIG. 17 causing the rearward rotation of the mast assembly 380 until the mast ultimately assumes the trailing position.

On convertiplanes such as described above, the mast conversion angle range is approximately 100° to 120°. Thus, the star gear system shown can be installed in the mast tilt mechanism which allows the mast to tilt approximately 120° while the pitch horn travels only approximately 50° to 60°. This amplifies the range of motion of the linear actuator system. The linear actuator could be replaced by a well-known screw jack or push-pull tube.

The foregoing describes my blade control system and mast conversion system for convertiplanes. It will be understood that various changes, alterations and modifications to the embodiments of the invention herein may be made by those skilled in the art without departing from the spirit and scope of the appended claims.

I claim:

1. A control apparatus for an aircraft, said aircraft including a rotatable mast including a hub through which the mast axis extends and at least one blade pivotally mounted on said hub having a folding axis generally transverse to the blade about which the blades fold and a pitch axis generally longitudinal of said blade about which pitch change occurs, first control means for moving said blade about its folding axis between a folded position substantially parallel with the axis of rotation of said mast and an operative position substantially normal thereto, second control means for positioning said blade about its pitch change axis, said mast being convertible between substantially horizontal and substantially vertical positions, said first and second control means being responsive to pilot operated control members, the improvement comprising:

(a) pitch change means cooperative with said second control means and including a motion transmitting member responsive to said second control member;

(b) motion amplification means interposed between said blade and said second control means whereby the range of control motion of said motion transmitting means is amplified; and (c) said motion transmitting means including a push-pull tube disposed generally parallel to one of said blade folding or mast axes to permit pitch changes to be made during blade folding and unfolding.

2. The control apparatus of claim 1 wherein said pitch change means includes a pitch horn operatively connected to said push-pull tube, said pitch horn including a housing having gear teeth circumferentially disposed about a shaft extending from said blade generally along the said pitch axis, said shaft including external gear teeth thereon and operatively connected to said internal gear teeth by one or more star gears interposed therebetween whereby the motion of said push-pull tube is amplified and transferred to said blade shaft.

3. The control apparatus of claim 1 further including blade locking means preventing pitch changes during a predetermined angular portion of the blade coning folding and unfolding cycle.

4. The control apparatus of claim 3 wherein said blade locking means include a fairing member having a generally conical surface rotatable with said hub, said fairing member defining a longitudinally extending slot therein adapted to engage said blade to prevent further pitch changes during said predetermined angular position of said blade coning folding and unfolding cycle.

5. The control apparatus of claim 4 wherein said longitudinal slot includes resilient means interposed between said blade and said slot.

6. The pitch change apparatus of claim 3 wherein said locking means comprises spaced-apart projections on said pitch horn and stop means on said hub which projection and stop means are engageable to restrain blade pitch changes when the blade reaches a predetermined folding angle.

7. An improved control apparatus for an aircraft having a wing, said aircraft including a rotatable mast having blades thereon, said mast being pivotal about a conversion axis extending generally longitudinally of said wing between a trailing position and a generally vertical position, the improvement comprising:

(a) a pitch horn having a housing including star gear teeth circumferentially disposed about a central gear, said control and star gears being generally concentric with respect to the mast conversion axis; and (b) actuator means operatively connected to said pitch horn whereby the range motion of the actuator is amplified to cause the mast position to change.

8. The control apparatus of claim 7 wherein said actuator means is an actuator.

9. The control apparatus of claim 7 wherein said actuator means comprises a push-pull tube.

10. The control apparatus of claim 7 wherein said actuator means comprise a screw jack.

11. A control apparatus for a convertiplane aircraft having a helicopter mode, said aircraft including a rotatable mast including a hub and at least one blade pivotally mounted on said hub having a folding axis generally transverse to the blade about which the blades fold and a pitch axis generally longitudinal of said blade about which pitch change occurs, first control means for moving said blade about its folding axis in a folding mode between a folded position substantially parallel with the axis of rotation of said mast and an operative position substantially normal thereto, second control means for positioning said blade about its pitch change axis, said mast being movable in a conversion mode between substantially horizontal and substantially vertical positions, said first and second control means being responsive to pilot operated control members, the improvement comprising:

(a) pitch change means cooperative with said second control means and including a motion transmitting member responsive to said second control member;

(b) motion amplification means interposed between said blade and said second control means whereby the range of control motion of said motion transmitting means is amplified, said motion amplification means including multiple gears arranged about the blade pitch axis to absorb torsional loads; and (c) said pitch control means being operatively connected to said second control means to control pitch during operation in any of the helicopter, conversion or folding modes of operation.

* * * * *